Patented Nov. 22, 1949

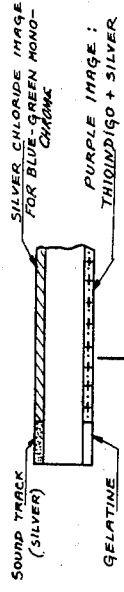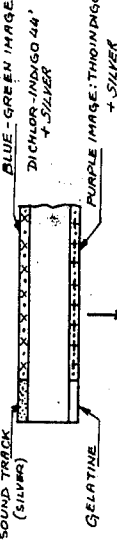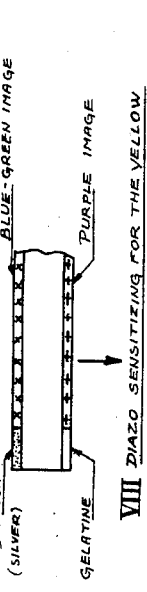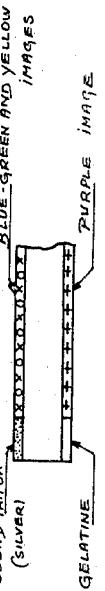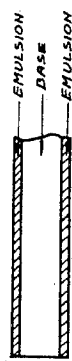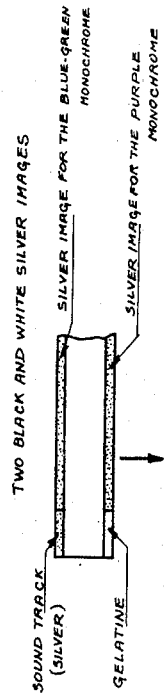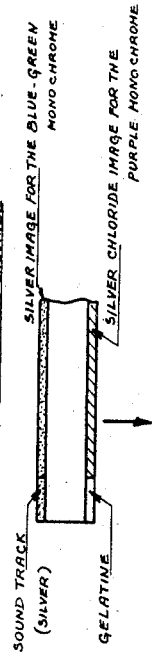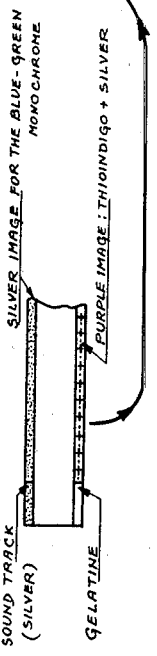

2,489,175

UNITED STATES PATENT OFFICE 2,489,175

PROCESS OF PRODUCING PHOTOGRAPHIC SUBTRACTIVE COLORED PICTURES AND SUCH PICTURES WITH A SOUND RECORD

Maurice Deguignes, Paris, France, assignor to Télé-Industrie, Société Anonyme, Paris, France Application May 22, 1946, Serial No. 671,652
In France May 11, 1945

Section 1, Public Law 690, August 8, 1946
Patent expires May 11, 1965

3 Claims. (Cl. 95—2)

It is known that in order to obtain a positive coloured image by subtractive synthesis, it is necessary to superimpose correctly three partial positive images, called mono-chromatic images, corresponding respectively to the purple, blue-green and yellow colours and obtained from three negatives which have been selected respectively from the green, orange and violet colours.

This invention has for its object a process for producing colour film by substractive synthesis which is more economic than the processes known up to the present. This new process is essentially characterized by the fact that, after impressing simultaneously the positive mono-chromatic purple and blue-green images, each on one side of a film bearing emulsion on both sides, and after developing these impressions so as to obtain images in black and white, the said images are transformed into indigoid dyes, and the positive image of the yellow colour is superimposed to one of the above mentioned images by sensitising with a diazo derivative which has been chosen so as to give, after exposure behind the third selected negative, a yellow image.

The invention has also for its object the application of the above defined process to the production of coloured sound films in which the sound band is impressed after the simultaneous impression of the positive mono-chromatic purple and blue-green images, preferably on the side of the film bearing the positive blue-green image.

The accompanying drawing is a flow diagram of the herein described process which is illustrated in detail by the diagrammatic figures in conjunction with the legends applied thereto.

A manner of putting the process according to this invention into practice and different modifications of the same will now be described.

After impressing simultaneously, in correct positioning and by means of a suitable device, the positive mono-chromatic images of the purple and blue-green colours, each on one side of the film, the sound band is impressed by means of a suitable machine, preferably on the side of the film which bears the blue-green image.

These three impressions are developed by means of a positive developer of the usual type, so as to obtain images in black and white. This development is best effected on the machines which are usually employed in the cinematographic industry and which are adapted to effect in a single operation all photographic treatments, including the drying of the film.

These operations do not need to be described more in detail since they are as a whole well known in the cinematographic industry.

The characteristic features of the process which is the object of this invention reside in the succession of operations which will now be described.

1. Colouring of the purple image

The side of the film bearing the black and white image corresponding to the mono-chromatic purple image to be obtained is imbibed with water, care being taken so as not to imbibe also the other side of the film.

Among the different known methods adapted for this operation, one of the most practical is the use of a conveniently striated rubber roller part of which is immersed in a container filled with water, the surface of the film which is to be imbibed with water being in contact with the part of the periphery of the roller which emerges from the water.

The film, one side of which has thus been moistened with water, then passes in a container of convenient shape which is filled with chlorine gas. By contact with the chlorine, the moist silver image is transformed into silver chloride, while the image on the other side of the film, which has remained dry, is not affected by the chlorine.

The whole film is then washed by running water and passed in a solution of sodium sulphite at 1% in order to remove the chlorine which has been absorbed by the gelatine.

After another washing, which removes the sodium sulphite, the film is passed in front of a mercury-vapour lamp to the rays of which the surface bearing the chloride image is exposed.

This image is then developed by immersing the whole film in a bath containing thioindoxyl which is alkalised by a small addition of caustic soda and protected against oxidation by a small quantity of sodium sulphite, according to a method introduced around 1907 by B. Homolka.

In this manner there is obtained an image wherein the silver chloride has been reduced to metallic silver and at the same time there has been formed a purple image constituted by insoluble thioindigo red.

The film is then rinsed by a jet of water and is dried as usually.

2. Colouring of the blue-green image

The dry film bearing on one side the red thioindigo image and on the other side the black and white silver image corresponding to the blue-green monochromatic image to be obtained is again imbibed with water by means of a wetting roller, as indicated above in operation No. 1, the said roller now wetting only the silver image intended to form the blue-green image, and not the sound band.

To this effect, the rim of the wetting roller has a width exactly equal to that of the image and the film making contact with the roller is conveniently guided so that the sound band does not touch the water and remains perfectly dry, as well as the thioindigo red image on the other side of the film.

This result being achieved, the whole film is treated as in operation No. 1 by chlorine gas which again affects only the wet part of the film, transforming the silver image carried thereby into silver chloride.

After washing with water and treating with a solution of sodium sulphite at 1%, the silver chloride is exposed to light and then developed by immersing the whole film in a bath containing indoxyl slightly alkalised by caustic soda and protected by a small quantity of sodium sulphite, according to the method of B. Homolka already mentioned above in the case of thioindoxyl.

In this operation is formed reduced silver and at the same time insoluble indigo blue which forms the blue-green image.

During these treatments, the sound band has undergone no modifications and is always constituted by metallic silver.

According to an advantageous modification of the process which is the object of this invention, the indoxyl is replaced by a halogen derivative, particularly by 4-chloro-indoxyl which produces, by development of the silver chloride image, a monochromatic blue-green image constituted by dichlor-indigo 4,4′ the colour of which is much better adapted to the desired trichromatic synthesis than indigo blue.

Furthermore, this chlorine derivate is less subject to oxidation by the air than the indoxyl itself and is better adapted for the composition of the developing bath which is better conserved and easier used industrially.

The blue-green image being obtained, the film is washed with running water, as in the preceding operations.

These operations have thus resulted in the formation on one side of the film of a purple image mixed with metallic silver, and on the other side of the film of a blue-green image mixed with metallic silver, while the image on the sound band is constituted only by silver.

3. Removal of the metallic silver from the coloured images

In order to remove the silver which accompanies the two monochromatic purple and blue-green images without destroying the silver which constitutes the sound band, use is again made of a roller which in this occurrence, is partially immersed in a container filled with a bath containing a reagent usually employed in photography for the removal of silver.

This reagent may be, for example: a solution of potassium permanganate or bichromate containing an addition of sulphuric acid, the Farmer mixture (potassium ferricyanide and sodium thiosulfate), a solution of ammonium persulphate, etc.

Among these reagents for removing the silver, it is preferred to use the solution of potassium permanganate added with sulphuric acid, its action being followed by a washing with water and by the usual treatment with sodium bisulphite. This process is well adapted to the use of the above described wetting rollers for impregnating the surfaces of the film to be treated, its action is quick and exactly localized, no liquid being applied beyond the surface to be treated.

The indigoid dyes used for the formation of the coloured images being very solid, their colour is not affected by the treatment with the permanganate.

For the removal of the silver accompanying the thioindigo red image, use is made of a roller the rim of which is as wide as the whole film, while for the removal of the silver accompanying the blue-green image the rim of the roller has a width corresponding exactly to that of the blue-green image, so that the sound band or track does not make contact with the said rim. This technique is substantially the same as that which has been used in an earlier operation of this process for wetting the image before chlorinating the same.

It is evident that a specially designed automatic machine may be adapted to effect this whole succession of operations continuously and with high speed.

It is also evident that the sound band can be placed on the side of the purple image instead of being on the side of the blue-red image, as hereinbefore described, without departing from the scope of this invention. The placing of the sound band on the side of the film which bears the blue-green image has been chosen in view of a modification of the process according to this invention in which this disposition allows the achievement of a result which is advantageous for the sound reproduction.

According to this modification, in the wetting of the side of the film bearing the image to be coloured blue-green, use is made of a wetting roller having the total width of the film band, so that the subsequent chlorination extends not only over the image, but also over the sound band, whereafter the whole is developed into blue-green and the metallic silver is removed only from the monochromatic image by means of a roller not wider than the said image and imbibing the same with the chosen removing reagent (such as potassium permanganate and sulphuric acid), while the metallic silver is not removed from the sound band.

In this case, the sound band is thus constituted by a reduced silver image mixed with a blue-green dye. It has been found that such a sound band image has a spectral absorption which is adapted for a correct reading of the sound track on a projecting apparatus of the commercial type using photoelectric cells of a current model (generally caesium cells) with loss of volume at the sound reproduction, due to the presence of metallic silver in the structure of the sound track, and to the absorption characteristic of the blue-green indigoid dye which has been used.

However, when it is desired to effect the sensitometer control under the conditions which are usually prescribed for sound recordings on films, it seems to be preferable to operate according to the method as previously described.

4. Obtaining of the yellow image

In order to realise the substractive trichromatic synthesis, it is now necessary to superimpose in correct position, to the above described purple and blue-green images, a third, yellow monochromatic image.

In order to obtain this result, numerous processes have been proposed. The solidity of the indigoid dyes used for the formation of the two purple and blue-green images, which has already been mentioned with respect to the removal of silver by means of permanganate and acid, as well as the passivity of these indigoids against a great number of other colouring substances allows the use of most of the known methods for obtaining yellow images, without the necessity of limiting the choice because of an incompatibility of the treatments and reactions with the substances which constitute the two first, purple and blue-green images.

However, according to this invention, the yellow image is preferably obtained by impregnating the gelatine carrying the purple or the blue-green image with a diazo derivative, preferably with a solution containing a mixture of an alkali diazo sulfonate and a suitable coupling agent. This impregnation may be effected by means of a roller, as aforesaid.

The film thus impregnated is dried and then exposed to the radiation of a powerful mercury-vapor lamp, through the negative film carrying the image selected for violet, and the yellow image completing the trichromatic combination is thus directly obtained.

The film is then washed with water so as to remove the excess of reagents remaining in the gelatine.

As diazo sulfonates giving an insoluble image of the required colour, use is preferably made of those obtained from ortho-substituted amines; it is known that these derivatives possess a higher sensitiveness to light and that they yield dyes the colour of which is more greenish and therefore closer to the ideal primary yellow.

As coupling agents may be used any substances giving with diazotized amines a yellow dye, preferably aryl derivatives of acetyl-acetic ester, pyrazolones, indols and generally all substances of low molecular weight having a methylene group which is able to couple.

The following example may be given, but it is specified that the invention is not to be limited to the same: The coupling agent may be constituted by a mixture of ortho chloraniline diazo sulphonate and phenyl methyl pyrazolone alkalised by a small quantity of caustic soda.

As the rapidity with which copies of the yellow image are obtained by this diazo sulphonate process is much less than that attained with silver bromide containing gelatine, this difference can easily be compensated by using, for the obtention of the copies in series, a copying machine having several windows and giving in each operation as many copies exposed through the film carrying the negative selected for the violet as there are windows provided in the machine.

It will be understood that the invention is not limited to the specific examples given and that various modifications are possible without departing from the scope of the appended claims.

I claim:

1. A process for producing color films by substractive synthesis, comprising impressing simultaneously the positive monochromatic purple and blue-green images one on each side of a film having a light sensitive silver halide emulsion on each side thereof, developing these impressions so as to obtain silver images, wetting the silver image of the purple monochrome only, treating the film with chlorine for such a length of time that the wetted silver image is converted to silver chloride, removing the chlorine absorbed by the gelatine, exposing the film to light, developing the film in a bath containing thioindoxyl which is alkalized and protected against oxidation, so as to reduce the silver chloride into metallic silver and to form an image of insoluble thioindigo red, drying the film, wetting the silver image of the blue-green monochrome only, treating the film with chlorine for such a length of time that the wetted silver image is converted to silver chloride, removing the chlorine absorbed by the gelatine, exposing the film to light, developing the film in a bath containing a substance selected from the group consisting of indoxyl and 4-chloro-indoxyl, said substances being alkalized and protected against oxidation, so as to reduce the silver chloride into metallic silver and to form an insoluble blue image, removing the metallic silver from the colored images, sensitizing one side of the film with a solution of an alkali diazo sulphonate and a coupling agent, and exposing the film to the radiation of a mercury-vapor lamp through the third selected negative, so as to obtain directly the yellow image.

2. The process of claim 1, in which, after the said simultaneous impression of the positive images to be colored purple and blue-green, the sound band is impresseed on one side of the film, said wetting of the image on the side of the film impressed with the sound band and the application of the reagent for said removing of the metallic silver being limited so as to exclude said band.

3. The process of claim 1, in which, after said simultaneous impression of the positive images to be colored purple and blue-green, the sound band is impressed on the side of the film bearing the positive image to be colored blue-green, said sound band is developed, wetted, treated with chlorine, exposed to light and colored together with said image to be colored blue-green, and the application of the reagent for said removing of the metallic silver is limited so as to exclude said sound band.

MAURICE DEGUIGNES.

REFERENCES CITED

The following references are of record in the file of this patent:

UNITED STATES PATENTS

| Number | Name | Date |
|---|---|---|
| 1,079,756 | Fischer | Nov. 25, 1913 |
| 1,710,455 | Langguth et al. | Apr. 23, 1929 |
| 2,008,457 | Lessertisseux | July 16, 1935 |
| 2,153,617 | Eggert et al. | Apr. 11, 1939 |
| 2,200,018 | Bertrand | May 7, 1940 |